United States Patent [19]

Israelsson

[11] Patent Number: 5,479,595
[45] Date of Patent: Dec. 26, 1995

[54] MOBILE TELEPHONY SYSTEM

[75] Inventor: Per V. Israelsson, Täby, Sweden

[73] Assignee: Telefonaktiebolaget LM Ericsson, Sweden

[21] Appl. No.: 714,566

[22] Filed: Jun. 13, 1991

[30] Foreign Application Priority Data

Jun. 25, 1990 [SE] Sweden ................... 9002244

[51] Int. Cl.$^6$ ................................ H04B 10/00
[52] U.S. Cl. .................. 359/145; 359/172; 359/152
[58] Field of Search ..................... 359/143, 144, 359/145, 148, 152, 154, 172, 173; 379/59, 60, 61, 63

[56] References Cited

U.S. PATENT DOCUMENTS

| | | | |
|---|---|---|---|
| 3,513,443 | 2/1967 | Andersen | 359/169 |
| 4,456,793 | 6/1984 | Baker et al. | 179/99 |
| 4,542,262 | 9/1985 | Ruff | 379/110 |
| 4,775,996 | 10/1988 | Emerson et al. | 379/56 |
| 4,790,000 | 12/1988 | Kinoshita | 379/59 |
| 4,856,090 | 8/1989 | Kitani et al. | 455/607 |
| 4,881,271 | 11/1989 | Yamauchi et al. | 455/56 |
| 4,975,926 | 12/1990 | Knapp | 359/159 |
| 5,034,997 | 7/1991 | Iwasaki | 455/59 |

FOREIGN PATENT DOCUMENTS 63-13379  6/1988  Japan ................ H04B 7/24

OTHER PUBLICATIONS

G. Feller, Infrared Microbroadcasting Network for In–House Data Communication, 1982.
PCT International–Type Search Report issued in connection with corresponding Swedish Patent Application No. 9002244–3, date Jun. 25, 1990.

Primary Examiner—Leo H. Boudreau
Assistant Examiner—Rafael Bacares
Attorney, Agent, or Firm—Burns, Doane, Swecker & Mathis

[57] ABSTRACT

A mobile telephony system intended for use by outdoor subscribers, for instance in cars, while affording, at the same time, high traffic capacity and relatively disturbance-free speech transmission to subscribers located within a building, for instance an office building. Signal transmission between mobile stations (MS, MSI) and base stations (BS1, BSI) is effected with radio waves in a first part-system (7), for instance intended for telephony traffic via car telephones, and with light, at least in the area nearest the mobile stations (MSI), in a second part-system (6) intended, for instance, for an office building. Signal transmission with light can also be effected in areas that contain electronic apparatus which is sensitive to radio disturbances, for instance in hospitals and/or in areas in which strong radio disturbances capable of preventing mobile telephony transmission with radio waves occur. Certain mobile stations may be capable of being switched between signal transmission with radio waves and signal transmission with light, which enables these stations to be used in both part-systems (7, 6).

1 Claim, 5 Drawing Sheets

MOBILE TELEPHONY SYSTEM

TECHNICAL FIELD

The present invention relates to a mobile telephony system, comprising mobile stations and base stations, intended for use in areas which normally differ from one another with regard to the traffic capacity required, sensitivity to radio disturbances and the occurrence of radio disturbances.

BACKGROUND ART

Present-day mobile telephony systems are normally intended for outside use. Although mobile telephones for use in such systems can often also be used indoors, the traffic capacity is greatly restricted, because the number of available radio channels for outside use is not sufficient to meet the demand of a large number of subscribers who rotate relatively close to one another, such as in an office building, for instance.

There are special mobile telephony systems for indoor use, such as inside office buildings and factories. Indoor systems, however, are assigned a different frequency band to systems that are intended for outdoor use and operate according to another standard, for instance according DECT instead of, for instance GSM. Consequently, a mobile telephone intended for an outdoor system cannot be used in an indoor system, and vice versa, which is a disadvantage.

There is proposed in Swedish Patent Application No. 9001312-9 a mobile telephony system which is intended for both outdoor and indoor use. The system includes an external part-system and an internal part-system. Adaptive channel allocation is applied in the internal part-system, therewith providing an indoor user access to all of the channels in the system. The transmitter powers are small in comparison with the transmitter powers in the external part-system, which makes it possible to use the radio channels in several cells within a building. There is, however, a serious risk that indoor connections will be disturbed by radio traffic from outdoor connections, so as to impair speech quality. A change of channel, so-called handoff, takes place when disturbances exceed a given level. The connection is broken when no free channel or non-disturbed channel is found. Thus, radio disturbances, which may also derive from other indoor connections, impair speech quality and limit the maximum traffic capacity in the internal part-system.

Furthermore, other types of electronic equipment than equipment for mobile telephony systems sensitive to disturbances from mobile telephones are found in some areas. For instance, medical apparatus in hospitals and control logic equipment in aircraft have been found to be disturbed by mobile telephones.

It is also found that the mobile telephone will not function when subjected to electrical disturbances generated in the vicinity of the mobile telephone. This can occur, for instance, in factories or plants in which certain electrical apparatus are installed.

It is a natural desire to obtain a mobile telephony system which can be used by outdoor subscribers, for instance in automotive vehicles while, at the same time, affording a high traffic capacity and a relatively disturbance-free speech transmission for indoor subscribers, for instance in buildings in which a large number of subscribers are located relatively close to one another. It is also desirable that the system can be used by subscribers who are present in locations where the surroundings contain disturbance-sensitive electronic apparatus of a kind different to that used in mobile telephony equipment, and in locations where ambient radio disturbances occur for reasons other than the presence of mobile telephony equipment.

DISCLOSURE OF INVENTION

The object of the present invention is to provide a mobile telephony system of the kind described in the introduction. In brief, such a system is obtained by transmitting signals between mobile telephones and base stations with the aid of radio waves in a first part-system, which is primarily intended for outdoor telephone traffic, e.g. via telephones in automotive vehicles, and with the aid of light, at least in the area nearest the mobile telephones, in a second part-system, for instance intended for use in office buildings. In this regard, at least some mobile telephones can be switched between radio signaling and light signaling, which enables the telephones to be used in both part-systems.

The invention is characterized by the characteristic features set forth in the following Claims.

BRIEF DESCRIPTION OF THE DRAWINGS

The invention will now be described in more detail with reference to the accompanying drawings, in which.

BEST MODE FOR CARRYING OUT THE INVENTION

Figure 1:
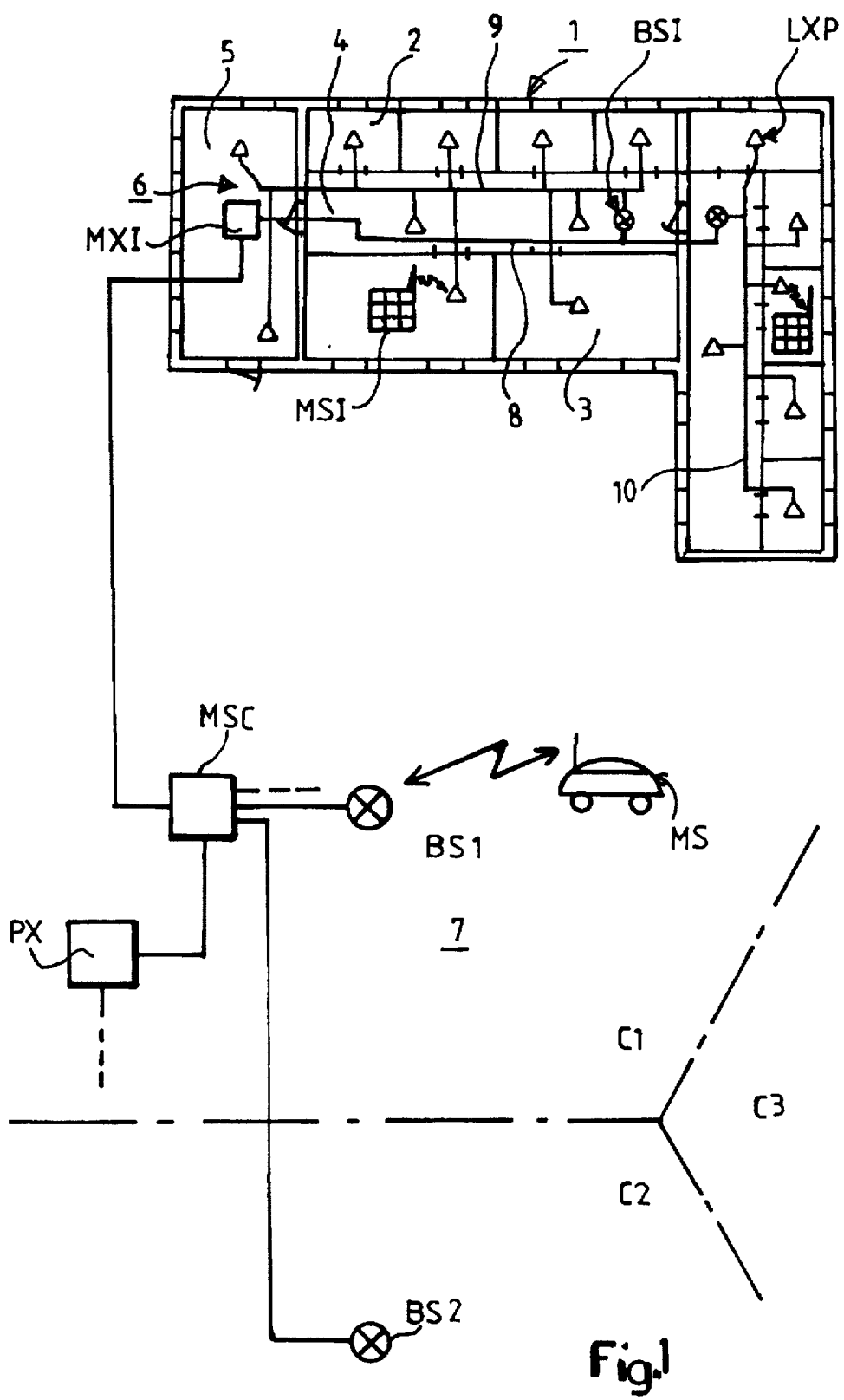
FIGS. 1 and 2 illustrate respectively a first and a second exemplifying embodiment of an inventive mobile telephony system.

FIG. 1 illustrates an exemplifying embodiment of an inventive mobile telephony system. The reference 1 identifies a building which includes offices 2, laboratory localities 3, corridors 4 and an entrance hall 5. The mobile telephony system includes an internal part-system 6 located within the building 1, and an external part-system 7 located outside the building. The internal part-system includes an internal switching centre MXI which is connected to an external mobile switching centre MSC, which, in turn, is connected to an exchange PX in the public line-carried telephone network. The internal switching centre MXI is also connected to the internal base stations BSI, through a conductor 8. The internal base stations BSI are connected to light-transmitting and light-receiving points LXP through conductors 9, 10. The reference MSI identifies internal mobile stations, i.e. mobile telephones.

When using the mobile stations MSI, signal transmission between said stations and the light-transmitting and light-receiving points LXP is effected with the aid of light, suitably infrared light. The conductors 9, 10 extending from the points LXP may be electrical conductors, wherein opto-electrical and electro-optical converters are incorporated in the points LXP. Alternatively, the conductors 9, 10 may be light conductors, wherein opto-electrical and electro-optical converters are incorporated in the base stations BSI. In this latter case, light amplifying devices are preferably incorporated in the points LXP. The manner in which the mobile stations and base stations are constructed for light signaling will be described in more detail here below.

Each internal base station BSI is intended to cover a particular area within the building 1, this area being referred to as a cell. Each cell comprises a plurality of sub-cells, each having a respective light-transmitting and light-receiving point LXP. Each room in the building may consist of one or more sub-cells, depending on the size and shape of the room concerned. Each cell may comprise up to about 50 sub-cells. In other words, about 50 light-transmitting and light-receiving points LXP can be connected to one single internal base station.

Since light signals within different rooms of a building do not disturb one another and are not disturbed by external radio traffic, it is possible in principle to achieve a high traffic capacity of any desired magnitude for indoor telephony. The absence of disturbances also contributes to good sound reproduction.

The external part-system 7 is divided into cells C1, C2 and C3. Each cell includes a base station, for instance BS1 or BS2, which is connected to the external mobile switching centre MSC. The reference MS identifies a vehicle-carried mobile station. The external part-system is described more comprehensively in, for instance, CMS 88, Cellular Mobile Telephone System, Ericsson Telecom AB, 1988.

Figure 2:
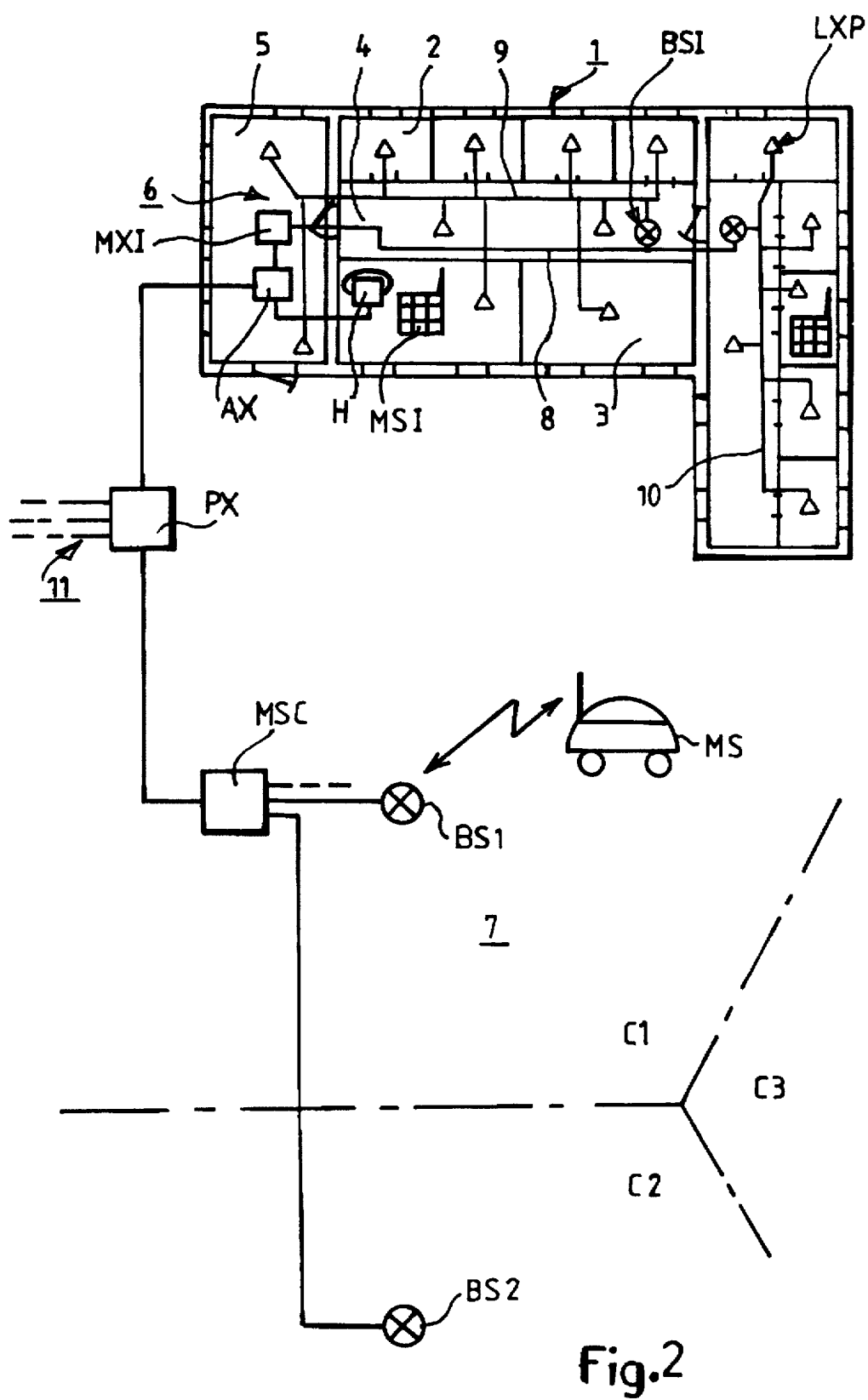

FIG. 2 illustrates an alternative embodiment of an inventive mobile telephony system. This embodiment differs from the FIG. 1 embodiment in that the two part-systems are mutually connected via a line connected public telephone network 11. The internal part-system is connected to a private branch exchange AX, which is connected to a public exchange PX in the public telephone network 11. The mobile switching centre MSC is also line-connected to the public exchange PX. A line-connected telephone set H is connected to the private subscriber exchange AX.

In both embodiments, the internal part-system 6 has access to the same number of channels as the external part-system 7, although in the form of modulation channels on light beams instead of on radio waves. The channel structure is the same as that of the external part-system, i.e. it includes test channels and traffic channels. The telephone system will preferably have a large traffic capacity in office buildings, for instance. It should be possible for the subscribers of mobile stations MSI within the building to use their respective stations simultaneously without disturbing one another, and the subscribers should be able to move freely within the building while being constantly in connection with a light-transmitting and light receiving point LXP. The channel allocation is therefore preferably adaptive, such that all internal base stations BSI have access to all channels. In addition to a desired high capacity, an adaptive system also provides advantages from the aspect of practical installation. An adaptive telephone system for indoor use is described in 39th IEEE Vehicular Technology Conference, Volume 1, May 1–3, 1989, Dag Akerberg: "Properties of a TDMA pico cellular Office Communication System".

Each light-transmitting and light-receiving point LXP is suitably connected to its base station BSI by two glass fibers for carrying light and four wires or cables for carrying electric current. This has certain consequences for handoff, i.e. the switching of channels. In general, there will be used a new light-transmitting and light-receiving point LXP which, however, belongs to the same base station BSI. Measurements and decisions which precede handoff are then very simple. The strength of the mobile signal at the light-transmitting and light-receiving point LXP concerned is measured in the base station BSI and a decision concerning handoff can be made without needing to effect measurements in the mobile. The strength of the mobile signal may signify the strength of the light or the amplitude of its amplitude modulation.

Figure 3:
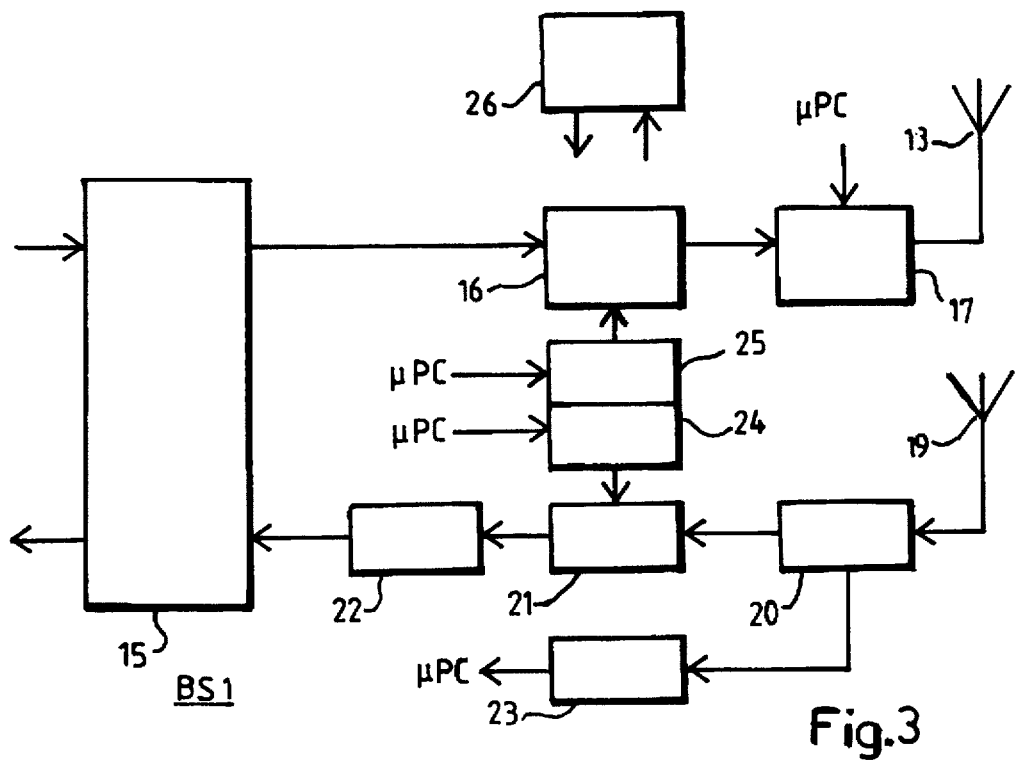
FIG. 3 illustrates an example of a base station for a known mobile telephony system.

FIG. 3 illustrates a base station for a known mobile telephony system. The reference 15 identifies a block which contains, among other things, a speech coder, a speech decoder, a channel coder, a channel decoder and an equalizer. The base station also includes a high frequency modulator 16, a power amplifier 17, a transmitter antenna 18, a receiver antenna 19, a receiver unit 20, a high frequency demodulator 21 and an intermediate frequency demodulator 22. The base station also includes means 23 for measuring the received signal strength, means 24, 25 for generating reception and transmission carrier waves in response to selected channels, and a control means 26 (Micro Processor Controller). The control means 26 receives signals from devices (not shown) in the block 15 and from the signal-strength measuring means 23. The control means delivers signals to given devices in the block 15 and to the power amplifier 17 and to the frequency generating means 24, 25. Among the illustrated means, this has been designated µPC, which stands for Micro Processor Controller.

The aforedescribed base station is of a known kind and can operate as the base station BS1 or BS2 in the external part-system 7 of the inventive mobile telephony system, as illustrated in FIGS. 1 and 2.

Figure 4:
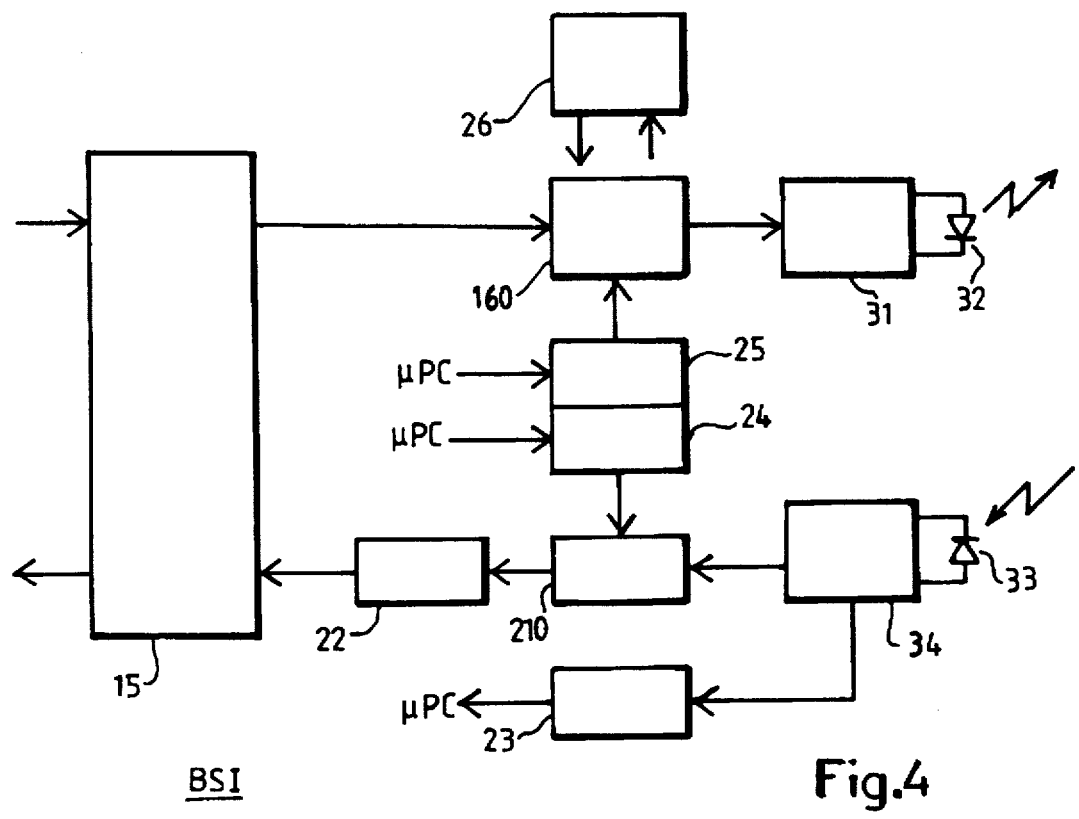
FIG. 4 illustrates an exemplifying embodiment of a base station intended for an inventive mobile telephony system.

FIG. 4 illustrates an exemplifying embodiment of a novel base station intended to function as the base station BSI in the internal part-system 6 of the inventive mobile telephony system. The majority of means included in the base station illustrated in FIG. 3 are also present in the base station illustrated in FIG. 4 and have been identified with the same reference signs as those earlier used. The high frequency modulator 16, the power amplifier 17 and the transmitter antenna 18 of the FIG. 3 embodiment, however, have been replaced with a high frequency modulator 160 and an amplifier 31, which are adapted for optical transmission, and by a light transmitting means 32, e.g. a photodiode or a laser diode. The receiver antenna 19 and the receiver unit 20 have been replaced with a light receiving means 33, e.g. a PIN-diode or an Avalanche Photo Diode and an amplifying means 34 which may also optionally convert current to voltage. The means 34 may, for instance, comprise a transimpedance stage. The high frequency demodulator 21 has been replaced with a high frequency demodulator 210, which is adapted to frequencies used in optical signaling.

This base station corresponds to the case when the electro optical and optoelectrical conversions take place in the base stations BSI and when light is conducted from these stations to the light-transmission and light-receiving points LXP through light conductors. In the second case, i.e. with electrical conductors between the base stations and the points LXP, the means 31–34 are incorporated in these points instead of in the base stations.

Figure 5:
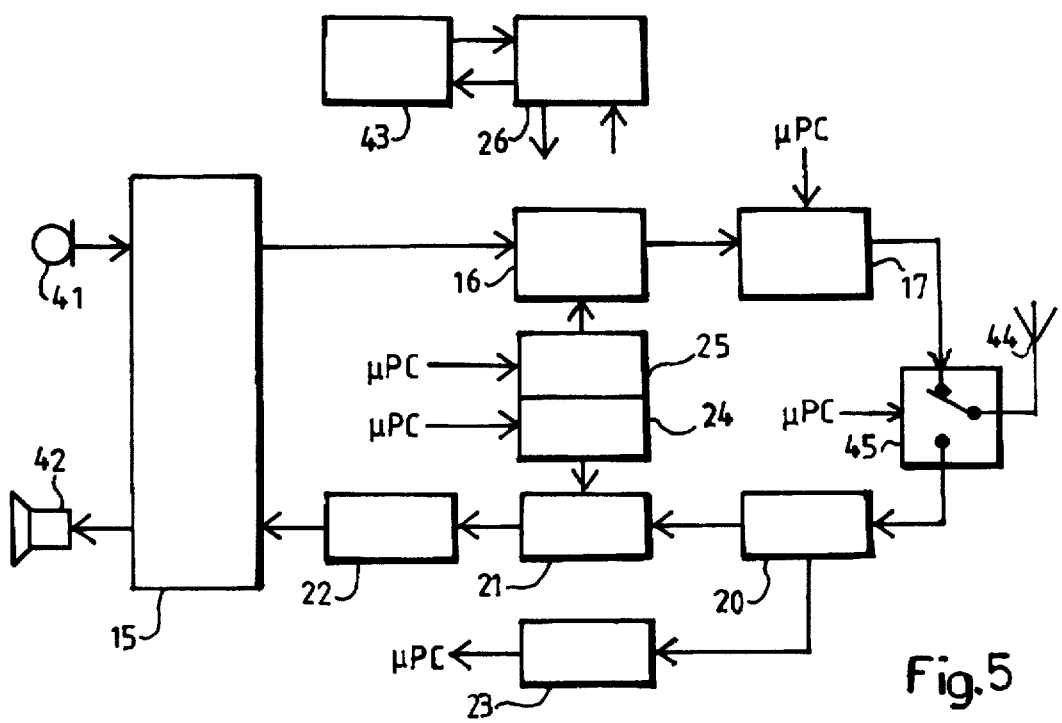
FIG. 5 illustrates an example of a mobile station for a known mobile telephony system.

FIG. 5 illustrates an example of a mobile station for a known mobile telephony system. The mobile station coincides essentially with the base station illustrated in FIG. 3, and means included in the FIG. 3 embodiment have been identified with the same reference signs as those earlier used. The mobile station differs from the base station illustrated in FIG. 3 mainly in that a microphone 41 and a loudspeaker or head telephone 42 are connected to the block 15, and in that a keyboard 43 is connected to the control means 26. Furthermore, there is used a common antenna 44 for transmitting and receiving purposes, this antenna being connected to the power amplifier 17 and the receiver unit 20 over a transmission-reception switch 45. This switch is controlled by the control means 26.

The aforedescribed mobile station is of a known kind and can function as the mobile station MS in the external part-system 7 of the inventive mobile telephony system.

Figure 6:
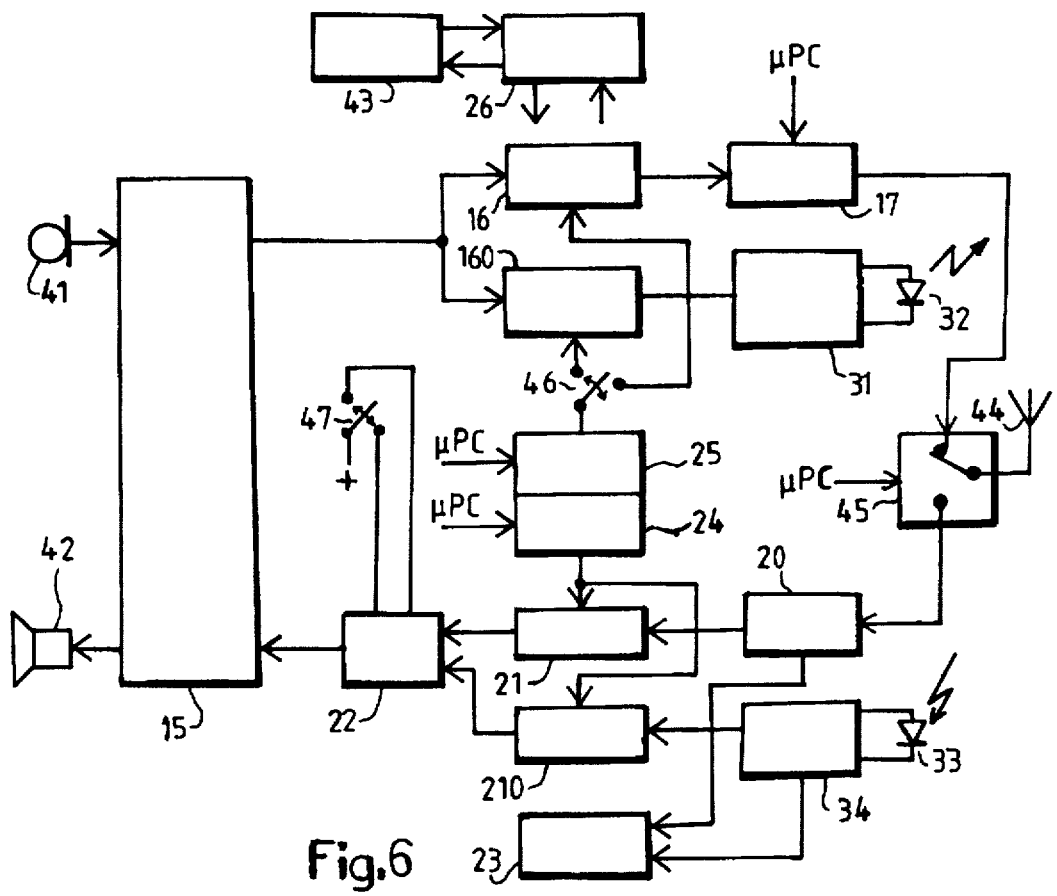
FIG. 6 illustrates an exemplifying embodiment of a mobile station intended for an inventive mobile telephony system.

FIG. 6 illustrates an exemplifying embodiment of a novel mobile station which is intended for use in both the external and the internal part-systems of the inventive mobile telephony system. The majority of the means included in the mobile station are also included in the mobile station illustrated in FIG. 5 and have been identified in the same way as that previously used. In addition to the high frequency modulator 16, the power amplifier 17 and the antenna 44, which are intended for transmission with radio waves, there is included a second high frequency modulator 160, an amplifier 31 and a light transmitting device 32 for transmitting with light. These devices are also included in the base station illustrated in FIG. 4. The mobile station can be switched with the aid of a switch 46 between a radio-wave transmission mode and a light transmission mode. In a first switching position, a transmission carrier wave is connected to the modulator 16, whereas in a second switching position a transmission carrier wave is connected to the modulator 160.

For reception purposes, the station includes, in addition to the antenna 44, the receiver unit and the high frequency demodulator 21, which are intended for radio waves, also a light receiving device 33, an amplifier device 34 and a high frequency demodulator 210, which are intended for light signals and which are included in the base station illustrated in FIG. 4.

The selection between radio-wave reception and light reception is effected with the aid of a switch 47 connected to the intermediate frequency demodulator 22. The switches 46 and 47 may, of course, be connected to other points than the points in the aforedescribed example. It is also possible to provide automatic switching between radio-signal and light-signal transmission in response to the detection or non-detection of the specific light used in the mobile station.

Figure 7A:
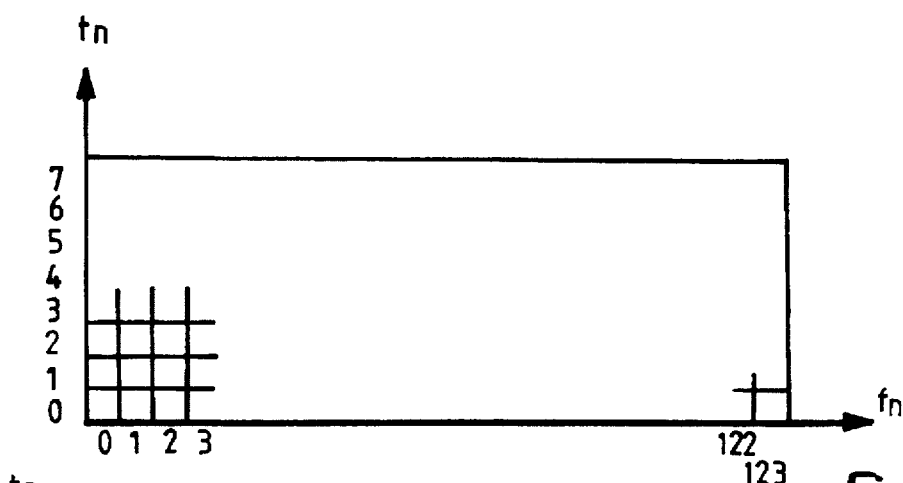
FIGS. 7a–7c are diagrams which illustrate the positioning of different transmission channels in the frequency band.
Figure 7B:
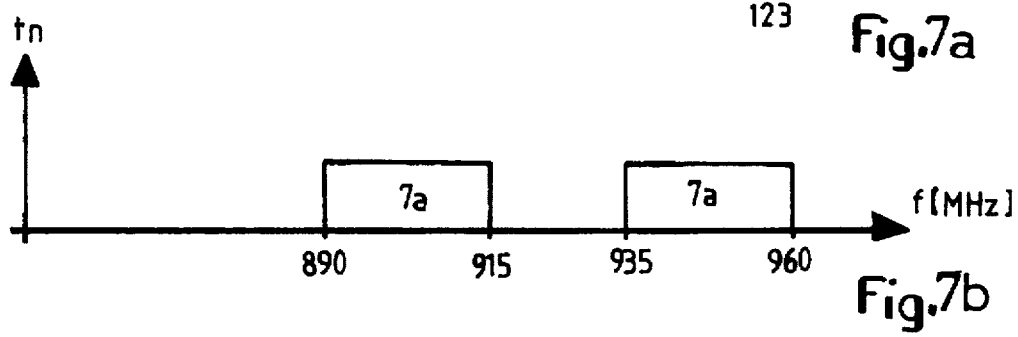
Figure 7C:
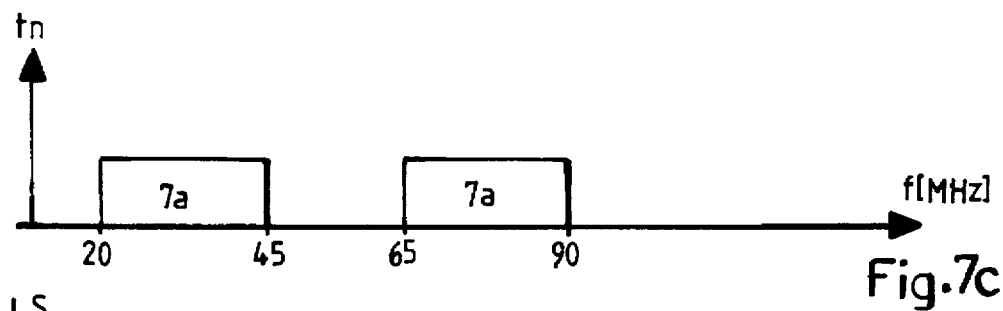

FIGS. 7a–7c illustrate examples of how different transmission channels are placed in the frequency band. In FIG. 7a, the reference fn identifies on the horizontal axis the number of different frequencies used in a GSM-system. The frequencies are numbered from 0 to 123 and are thus 124 in number. Each time frame includes 8 time slots, which have been numbered from 0 to 7 on the vertical axis. The reference tn identifies the time slot number. 124 frequencies and 8 time slots in each time frame provides 124×8=992 different channels.

FIG. 7b illustrates how the 992 GSM-channels are placed in the frequency band. Each of the two rectangles in the Figure symbolizes 992 channels of the kind illustrated in FIG. 7a, and the rectangles have accordingly been referenced 7a. The frequencies in the left rectangle lie between 890 and 915 MHz and are used when transmitting from mobile stations. The frequencies in the right rectangle lie between 935 and 960 MHz and are used when transmitting from base stations.

In the inventive mobile telephony system, transmission through air is at times effected with light instead of with radio waves. For instance, the amplitude of a light beam is modulated with one of the 124 different frequencies. In order to enable relatively inexpensive components to be used for electrooptical and optoelectrical conversion, it is preferred to select frequencies beneath 100 MHz instead of frequencies of about 900 MHz. FIG. 7c illustrates an example of suitable frequency bands for transmission from mobile stations and base stations respectively.

Figure 8:
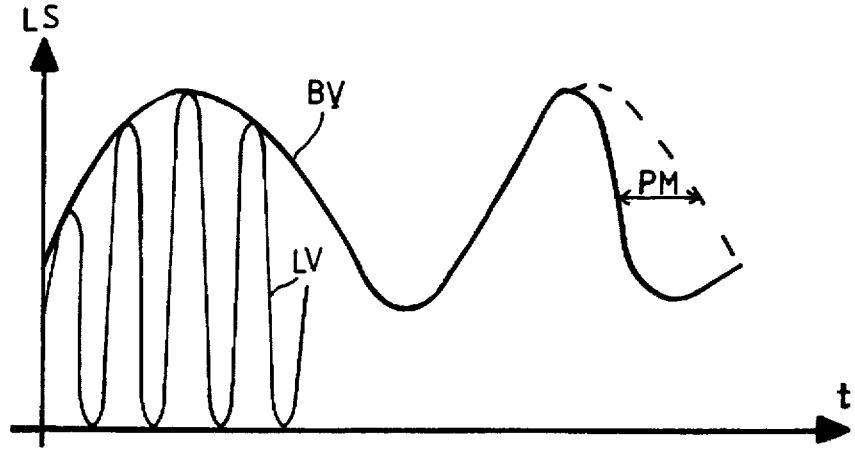
FIG. 8 illustrates an example of how a lightwave can be modulated.

FIG. 8 illustrates an example of the principle of how a light-wave can be modulated. The light strength is designated LS and the time t. The amplitude of a lightwave LV is modulated by an electric carrier wave BV, which in turn is modulated by the information to be transmitted on the channel. In this case, the information is phase-modulated on the carrier wave BV. This phase modulation has been designated PM in the Figure. The lightwave is modulated so that at least a given light amplitude will always be present.

Naturally, some mobile stations may be intended solely for signal transmission with radio waves and some solely for signal transmission with light, and cannot therefore be switched in this respect.

Signal transmission with light may also be suitable outdoors at so-called telepoints, so as to achieve a higher traffic capacity than that achieved with conventional mobile telephony traffic when signal transmission is effected with radio waves.

The transmission between mobile stations and a base station in aircraft can be effected with light, therewith avoiding radio disturbances of control logic equipment installed in the aircraft.

Similar to known mobile telephony systems, it is also possible, of course, to use radio signaling within buildings when, for instance, a temporary fault occurs in a part-system for optical signaling.

I claim:

1. A mobile telephony system comprising mobile stations and base stations, intended for use in areas which are normally relatively different with regard to the required traffic capacity, sensitivity to radio disturbances and the occurrence of radio disturbances, comprising a first part-system (7) intended for use in areas populated by vehicular mobile stations, and a second part-system (6) intended for use in buildings; and in that said part-system (7,6) are arranged in a manner such that signal transmission between mobile stations (MS) and base stations (BS1) in the first part-system (7) is effected with radio waves and in the second part system (6) is effected with light, at least in the area nearest the mobile station (MSI), wherein the mobile stations (MSI) which contain both means for the transmission of signals with radio waves and means for the transmission of signals with light; and that these stations (MSI) are arranged in a manner such as to enable said stations to be switched between radio-wave signal transmission and light signal transmission.

* * * * *